United States Patent [19]

Saegusa

[11] Patent Number: 4,629,304

[45] Date of Patent: Dec. 16, 1986

[54] TEST SYSTEM FOR CAMERA

[75] Inventor: Takashi Saegusa, Kawasaki, Japan

[73] Assignee: Nippon Kogaku K. K., Tokyo, Japan

[21] Appl. No.: 650,225

[22] Filed: Sep. 13, 1984

[30] Foreign Application Priority Data

Sep. 20, 1983 [JP] Japan .................................. 58-173662

[51] Int. Cl.[4] .......................... G03B 7/08; G03B 7/091
[52] U.S. Cl. ................................. 354/432; 354/289.12
[58] Field of Search ............ 354/410, 412, 432, 289.1, 354/289.11, 289.12

[56] References Cited

U.S. PATENT DOCUMENTS 4,149,795  4/1979  Sakurada et al. ............... 354/289.12
4,401,373  8/1983  Nakai ................................. 354/412
4,465,369  8/1984  Saegusa et al. ..................... 354/432

Primary Examiner—Russell E. Adams
Attorney, Agent, or Firm—Shapiro and Shapiro

[57] ABSTRACT

A camera for exposing an object on a film and storing therein data in bits is disclosed. The camera comprises a terminal for the input of a determined signal, means for generating a synchronizing signal, means for detecting the input of the determined signal to the input terminal and generating a detection signal when the input is detected, means for generating a signal having one of two different levels in response to the detection signal, means for generating the data bit by bit serially in response to the signal having the one level and in synchronism with the synchronizing signal, and an output terminal electrically connected with the data generating means to output the data generated from the data generating means. A system for testing the camera is also disclosed.

11 Claims, 22 Drawing Figures

FIG.1A  FIG.1B
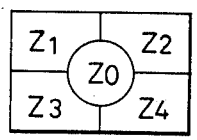
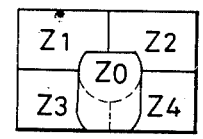
FIG.2
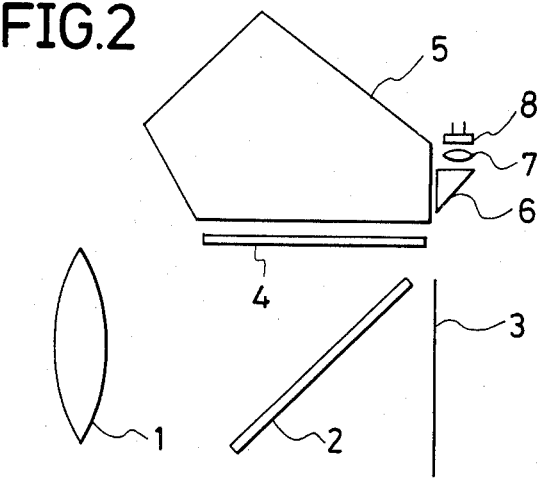
FIG.3
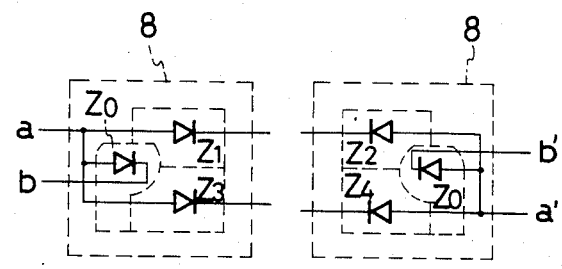

FIG.11
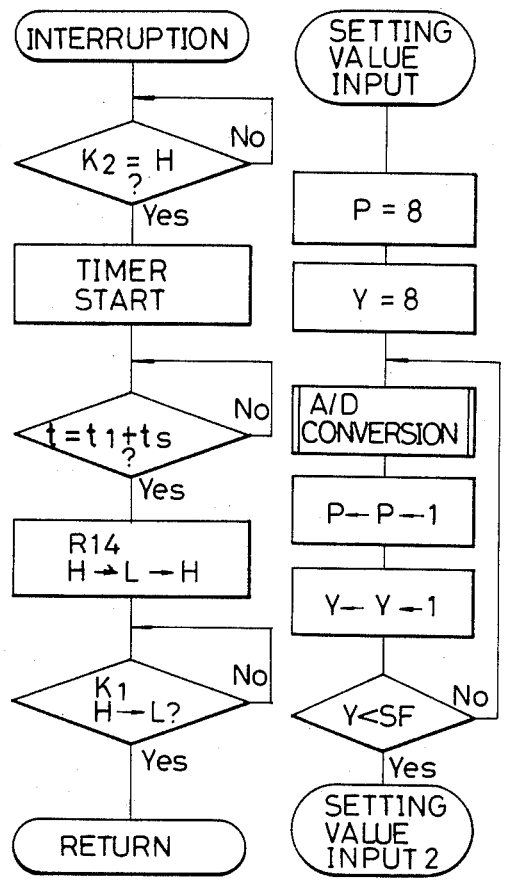
FIG.12
FIG.13
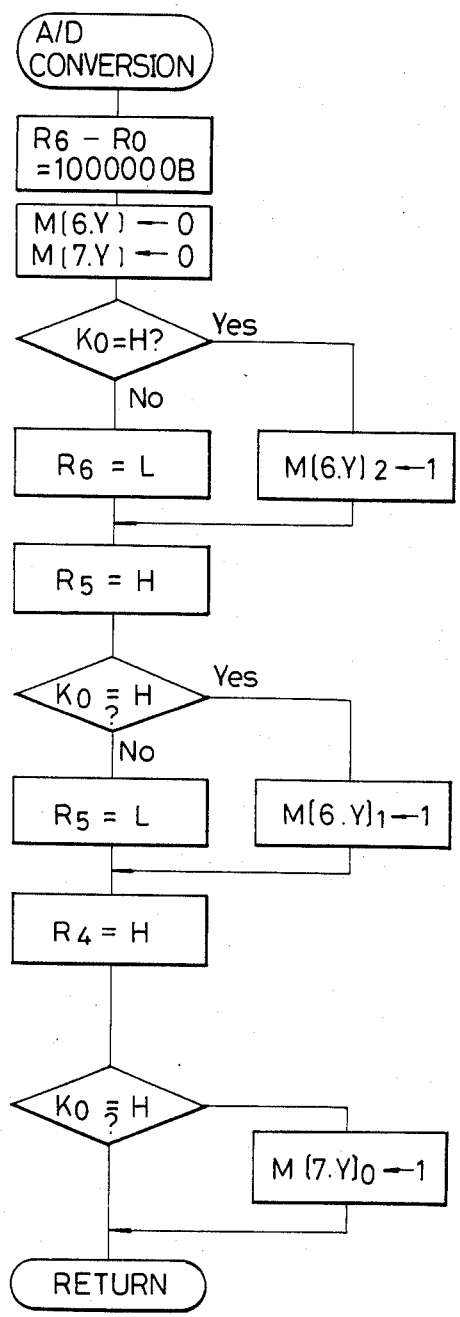

A : STANDARD PROGRAM
B : HIGH SPEED PROGRAM

TEST SYSTEM FOR CAMERA

BACKGROUND OF THE INVENTION

The present invention relates to a camera provided with input and output terminals used for easy diagnosis and adjustments of a complicated camera and also to a test system adapted for such a camera.

DESCRIPTION OF THE PRIOR ART

At present there are many types of cameras provided with many functions and therefore with many switches used for selecting and setting exposure metering modes, shutter speed etc. Because of the complexity of structure, very difficult and time-consuming work is required to check any trouble in the camera. As a kind of such multi-functional cameras there is a camera provided with a so-called multi-pattern metering system in which the picture area of the object field is divided into zones and the zones are individually measured for light by light-receiving sensor elements. An optimum exposure value is obtained by a computation from the outputs derived from the respective measured zones. In such type of camera, in particular, in the case where only one display device is present in the camera's finder, the adjustment and check of the many metering outputs are extremely difficult to do.

SUMMARY OF THE INVENTION

Accordingly it is an object of the invention to provide a system which enables an operator to easily read out the status of switch input and the values of metering outputs thereby allowing easy adjustment and diagnosis of the camera through an adaptor mounted thereon.

Other and further objects, features and advantages of the invention will appear more fully from the following description taken in connection with the accompanying drawings.

BRIEF DESCRIPTION OF THE DRAWINGS

FIGS. 1A and 1B show examples of the pattern for multi-pattern metering;

FIG. 2 is a schematic view of a metering optical system,

FIG. 3 shows a pattern of a multi-segment SPD;

FIG. 11 is a flow chart of a sub-routine for interruption;

FIGS. 12 and 14 are flow charts of a sub-routine for the input of set values;

FIG. 13 is a flow chart of a sub-routine for A/D conversion;

DESCRIPTION OF THE PREFERRED EMBODIMENTS

Figure 4:
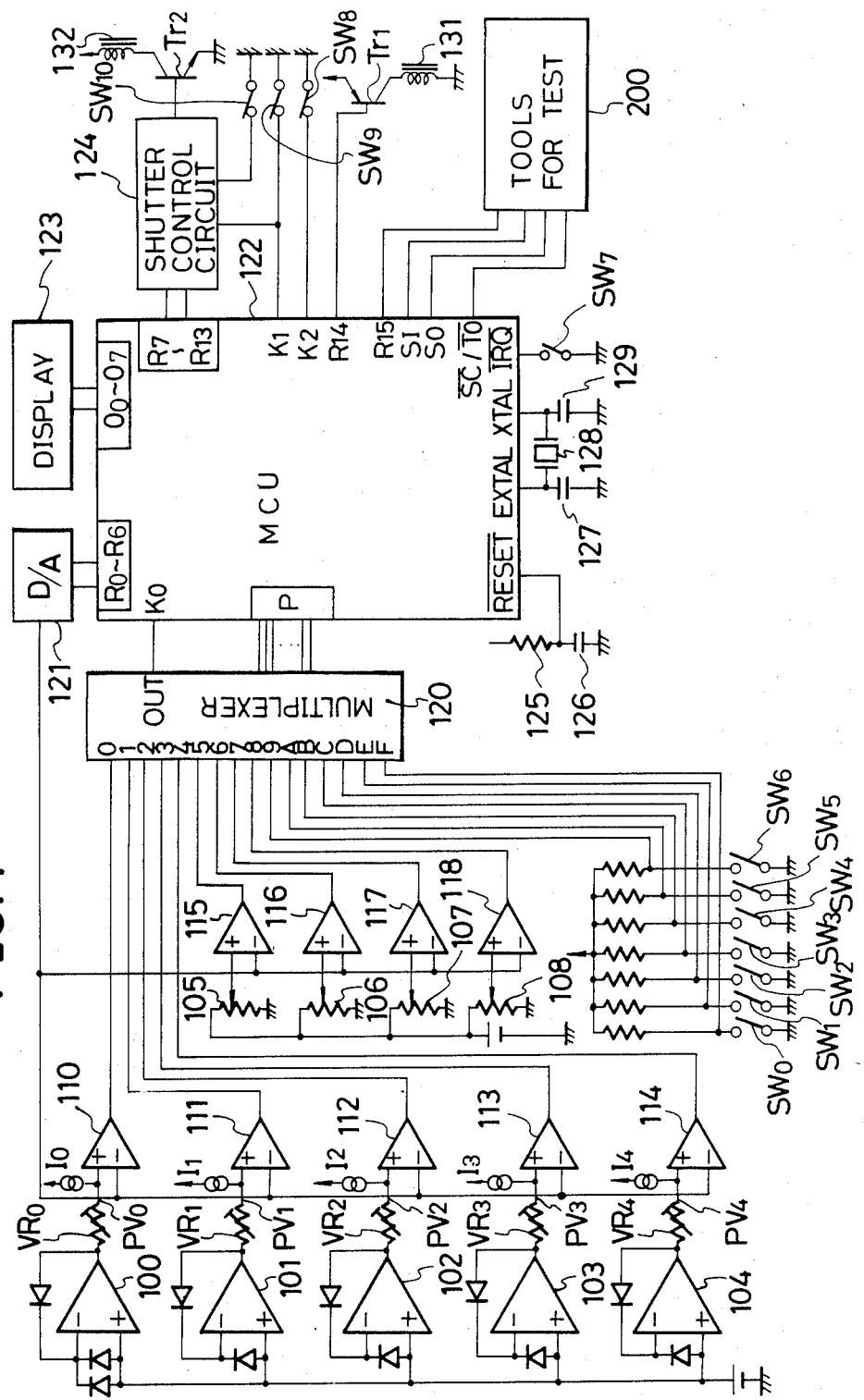
FIG. 4 is a block diagram showing an embodiment of the invention.

As previously mentioned, in the multi-pattern metering to which the present invention is pertinent, the picture area of an object field is divided into a plural number of zones or sections which are individually metered. FIG. 1A shows an example of the manner of division for the multi-pattern metering. In this example, the object field area is divided into five zones, namely a central zone Z1 and four peripheral zones Z1, Z2, Z3 and Z4 surrounding the central zone. FIG. 1B shows a modification of the example shown in FIG. 1A. In the modification the central zone Z0 has a sensitive area expanded toward the lower part as compared with the example shown in FIG. 1A. Of course, the picture area may be divided in various manners other than the shown examples. But it has been admitted that the complexity of the circuit and the effect of multi-pattern metering can be well balanced by dividing the picture area into five zones in the manner as shown in FIGS. 1A and 1B (cf. U.S. Pat. No. 4,274,721).

FIG. 2 shows the light-measuring optical system useful for the apparatus according to the invention.

1 denotes a picture taking lens, 2 a quick-return mirror and 3 a film plane. Although not shown, a shutter is provided in front of the film plane 3. 4 is a finder screen and 5 is apentagonal prism. The light exiting from the prism 5 is guided to the eye of the operator through an eye-piece 9 (not shown). Through the eye-piece the operator can observe the picture area of the object field. On both sides of the eye-piece is provided each a set of rectangular prism 6, condenser lens 7 and silicon photo diode (hereinafter referred to as SPD).

FIG. 3 shows the pattern of the SPD designed to realize the division of object field as previously shown in FIG. 1B. Z0 to Z4 in FIG. 3 correspond to the zones Z0 to Z4 in FIG. 1B. In FIG. 3, the central zone Z0 includes the left-hand SPD and the right-hand SPD parallel-connected to each other by the connection of terminal a with terminal a' and the connection of b with b'.

An embodiment of the present invention is shown in FIG. 4.

In FIG. 4, metering circuits 100 to 104 are of the type known per se and generate photometric outputs related to the central zone (Z0) and peripheral zones (Z1 to Z4) respectively.

The output of the metering circuit 100 is connected to a comparator 110 through a semi-fixed resistor VR0. The output is pulled up by a constant current source I0. Consequently, the output is level-shifted by an amount of voltage corresponding to VR0×I0. The adjustment of the metering output is carried out using a standard lens (in this embodiment the standard lens is a lens of 50 mm, F 1.4) and a reference surface having a uniform distribution of luminance. By suitably setting the semi-fixed resistor VR0 the output of the metering circuit 100 is so adjusted that for the reference surface the metering circuit generates a determined level of output. The output of the metering circuit for measuring the light on the central zone is referred to as the metering output PV0. Similarly, the outputs of the metering circuits for measuring the peripheral zones Z1 to Z4 are adjusted by the associated semi-fixed resistors VR1, ..., VR4 and constant current sources $I_1, ..., I_4$ to generate metering outputs PV1 to PV4. In other words, the outputs of the metering circuits are adjusted by VR0 to VR4 in such manner that when the standard lens is mounted on the camera, the outputs PV0 to PV4 are all the same for the reference surface of uniform luminance.

As previously described in connection with FIG. 3, the metering circuit 100 for the central zone contains two SPDs connected in parallel.

Potentiometers 105 to 108 serve as data setting devices for setting information of film sensitivity, information of shutter speed, information of preset aperture value and information of the maximum aperture value (stop fully opened).

Designated by 110 to 118 are successive comparators, 120 is a multiplexer, 121 is a D/A converter and 122 is a micro-computer unit (hereinafter referred to as MCU).

The multiplexer 120 is of the known construction. It receives a 4-bit P port output O-SF from the MCU and selects one of sixteen input signals to the multiplexer 120. The selected input signal is transmitted to an output terminal OUT. D/A converter 121 is a known 7-bit converter whose terminals $2^6$–$2^0$ are controlled by terminals R6-R0 of the MCU 122 to generate 128 steps of analog quantity from 0 to 127.

MCU 122 may be a known and commercially available microcomputer. In this embodiment a 4-bit one chip micro-computer MB8851 supplied by FUJITSU Ltd., is used as the MCU 122 for the purpose of explanation.

Data are compared and A/D converted successively by one of the comparators 110 to 118 selected by the P port output of MCU 122 through the multiplexer, D/A converter and MCU 122. The following table, Table 1 shows such information to be A/D converted and introduced into MCU 122.

among P-, S-, A- and M-modes as shown in the following Table 2. P-mode is a so-called programmed mode in which the aperture value and shutter time are automatically determined by the measured luminance value of the object and only the setting of film sensitivity value is required. S-mode is a shutter speed priority mode in which the aperture value is automatically determined in the camera when a shutter speed is manually set. A-mode is an aperture priority mode in which the shutter speed (shutter time) is automatically determined in the camera when an aperture value is manually set. M-mode is a manual mode in which the operator determines both of aperture value and shutter speed while viewing the display. The operations of switches SW3 to SW6 are summarized in the following Tables 3 to 5.

TABLE 2

| Exposure control mode | SW2 | SW1 |
|---|---|---|
| P | ON | ON |
| S | OFF | ON |
| A | OFF | OFF |
| M | ON | OFF |

TABLE 3

| Mode of Metering | SW3 |
|---|---|
| MULTI=PATTERN METERING | OFF |
| CENTERWEIGHTED METERING | ON |

TABLE 4

| | SW4 |
|---|---|
| A focal length signal | OFF |
| No focal length signal | ON |

TABLE 5

| | SW6 | SW5 |
|---|---|---|
| Wide angle lens | OFF | OFF |
| Telephoto lens | OFF | ON |
| Teleconversion lens | ON | OFF |

TABLE 1

| A/D converted value | [PV]$_{H,L}$ 50/1.4 ASA/ISO 100 | BV-AV$_O$ | [SV]$_{H,L}$ ASA/ISO | SV | [TV]$_{H,L}$ shutter speed | TV | [AV-AV$_O$]$_{H,L}$ 50/1.4 AV-AV$_O$ | | [AV$_O$]$_{H,L}$ AV$_O$ | |
|---|---|---|---|---|---|---|---|---|---|---|
| $ 0  | LV 0 | −6 | 3 | 0 | 1 | 0 | 1.4 | 0 | | 0 |
| $ 6  | 1 | −5 | 6 | 1 | 2 | 1 | 2 | 1 | F 1.4 | 1 |
| $ C  | 2 | −4 | 12 | 2 | 4 | 2 | 2.8 | 2 | F 2 | 2 |
| $ 12 | 3 | −3 | 25 | 3 | 8 | 3 | 4 | 3 | F 2.8 | 3 |
| $ 18 | 4 | −2 | 50 | 4 | 15 | 4 | 5.6 | 4 | F 4 | 4 |
| $ 1E | 5 | −1 | 100 | 5 | 30 | 5 | 8 | 5 | F 5.6 | 5 |
| $ 24 | 6 | −0 | 200 | 6 | 60 | 6 | 11 | 6 | F 8 | 6 |
| $ 2A | 7 | 1 | 400 | 7 | 125 | 7 | 16 | 7 | F 11 | 7 |
| $ 30 | 8 | 2 | 800 | 8 | 250 | 8 | | | | |
| $ 36 | 9 | 3 | 1600 | 9 | 500 | 9 | | | | |
| $ 3C | 10 | 4 | 3200 | 10 | 1000 | 10 | | | | |
| $ 42 | 11 | 5 | 6400 | 11 | 2000 | 11 | | | | |
| $ 48 | 12 | 6 | 12800 | 12 | 4000 | 12 | | | | |
| $ 4E | 13 | 7 | | | | | | | | |
| $ 54 | 14 | 8 | | | | | | | | |
| $ 5A | 15 | 9 | | | | | | | | |
| $ 60 | 16 | 10 | | | | | | | | |
| $ 66 | 17 | 11 | | | | | | | | |
| $ 6C | 18 | 12 | | | | | | | | |
| $ 72 | 19 | 13 | | | | | | | | |
| $ 78 | 20 | 14 | | | | | | | | |
| $ 7E | 21 | 15 | | | | | | | | |
| $ 7F | 21 1/6 | | | | | | | | | |

Switch SW0 is a switch which is opened for normal use of the camera and closed for test of the camera.

Switches SW1 and SW2 are opened and closed according to the mode selected by a mode selector dial A resistor 125 and a condenser 126 are connected to RESET terminal of MCU 122 to reset the latter when the power source of the camera is turned on. To generate a reference clock for MCU 122 there is provided an oscillator 128 driven by condensers 127, 129 and an oscillation circuit in MCU 122. Connected to IRQ terminal of MCU 122 is a release switch SW7 by which an interruption is brought into MCU 122 at the time of releasing.

When the output of R14 of MCU 122 is turned to high level (hereinafter referred to as "H") from low level ("L"), a transistor Tr1 is rendered conductive to energize a diaphragm stopping magnet 131 by which the motion of aperture stopping-down is stopped after releasing. SW8 is a stop-down start switch which is normally closed and for the stop-down after releasing it is opened. SW9 is a mirror switch which is normally closed. Immediately before mirror-up the switch is opened and closed again after mirror-down. SW10 is a trigger switch which is normally closed and it is opened when the leading shutter member begins to open.

Shutter time (shutter speed) is controlled by a shutter control circuit 124 in the range of 1 to 1/4000 sec. in accordance with the value of R13-R7 of MCU 122.

Shutter control is carried out in the following sequence:

With the turn-up of the mirror after releasing, the switch SW9 is turned to OFF from ON and the transistor TR2 is rendered conductive to energize a trailing shutter member-anchoring magnet 132. Thus, the magnet holds the trailing shutter member in the position in substitution for mechanical anchoring means. When the trigger switch SW10 is turned to OFF from ON but after the lapse of a determined shutter time set by the terminal R13-R7 of MCU 122, the transistor Tr2 is rendered non-conductive to deenergize the anchoring magnet 132. Therefore, the trailing shutter member is allowed to start running. In this manner the shutter time is controlled.

Figure 5:
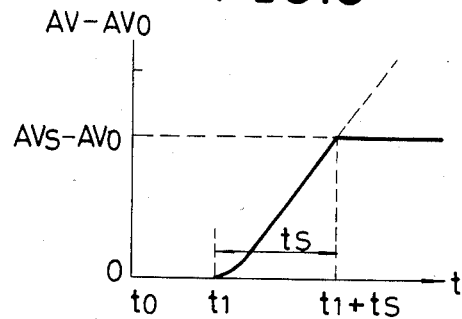
FIG. 5 illustrates the manner of aperture control.

FIG. 5 shows the manner of aperture stop control. In FIG. 5, time is plotted on abscissa and the step of stop-down on ordinate. $AV_S$ is the stop value controlled and $AV_O$ is the value of stop fully opened (herein referred to also as the maximum aperture value). Providing that the lens is controllable in aperture value, the aperture changes linearly with time by stopping-down as shown in FIG. 5. t0 is the time point at which the shutter is released. t1 is the time point at which the stop-down motion is started. As the aperture changes linearly, therefore, the aperture value can be controlled to a desired number of stopping steps, $AV_S$-$AV_O$ by determining the time length from t1 to $t_S$.

Figure 6:
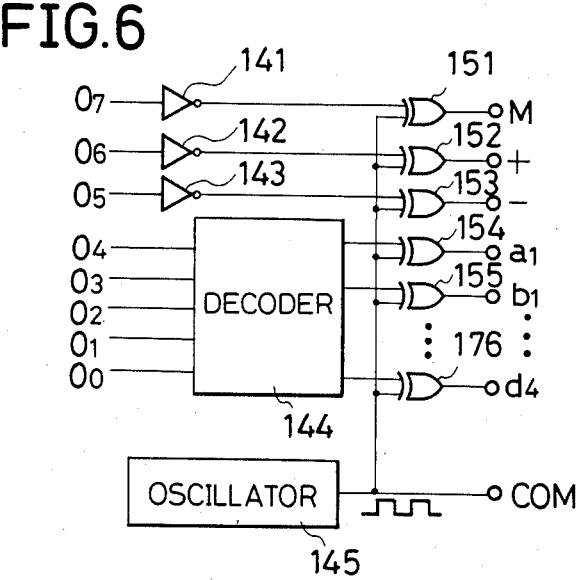
FIG. 6 is a block diagram of the display circuit 123 in FIG. 4.
Figure 7:
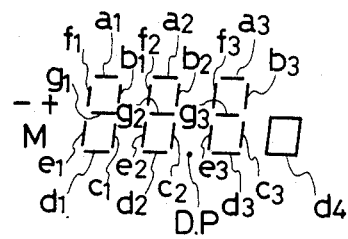
FIG. 7 shows an example of a display pattern.

FIG. 6 shows a detailed construction of the display circuit 123 shown in FIG. 4. In this embodiment, the value for exposure is displayed within the camera finder by LCD (liquid crystal) in the form as shown in FIG. 7.

To this end, the output stage of the display circuit is composed of exclusive OR 151 to 176. An oscillator 145 drives a common electrode COM. To realize the displays shown in the following table, Table 6, there is provided a decoder 144.

TABLE 6

| 0₄ 0₃ 0₂ 0₁ 0₀ | display | 0₄ 0₃ 0₂ 0₁ 0₀ | display |
|---|---|---|---|
| 00000 | F-- | 10000 | 1 |
| 00001 | F 1.4 | 10001 | 2 |
| 00010 | F2 | 10010 | 4 |
| 00011 | F2.8 | 10011 | 8 |
| 00100 | F4 | 10100 | 15 |
| 00101 | F5.6 | 10101 | 30 |
| 00110 | F8 | 10110 | 60 |
| 00111 | F11 | 10111 | 125 |
| 01000 | F16 | 11000 | 250 |
| 01001 | F22 | 11001 | 500 |
| 01010 | F32 | 11010 | 1000 |
| 01011 | F45 | 11011 | 2000 |
| 01100 | F64 | 11100 | 4000 |
| 01101 | 0 | 11101 | LO |
| 01110 | 88.88 | 11110 | HI |
| 01111 |  | 11111 | . |

Inverters 141 to 143 generate H outputs when 07 to 05 are L respectively. The outputs of exclusive OR 151 to 153 are inverted in phase to that of the common terminal COM. Thereby, ⌈M⌋ or ⌈+⌋, ⌈−⌋ is displayed as shown in FIG. 7. Also, when the output of the exclusive OR 154–176 and the output of the common terminal COM are rendered opposite to each other in phase by the decoder 144, selected ones of seven display segments shown in FIG. 7 become colored so as to make a display as shown in Table 6. When MCU 122 is reset, all of the outputs become H. Therefore, 0₇ to 0₀ are all "H", all of the display elements in FIG. 7 are in the state display cancelled.

Figure 8:
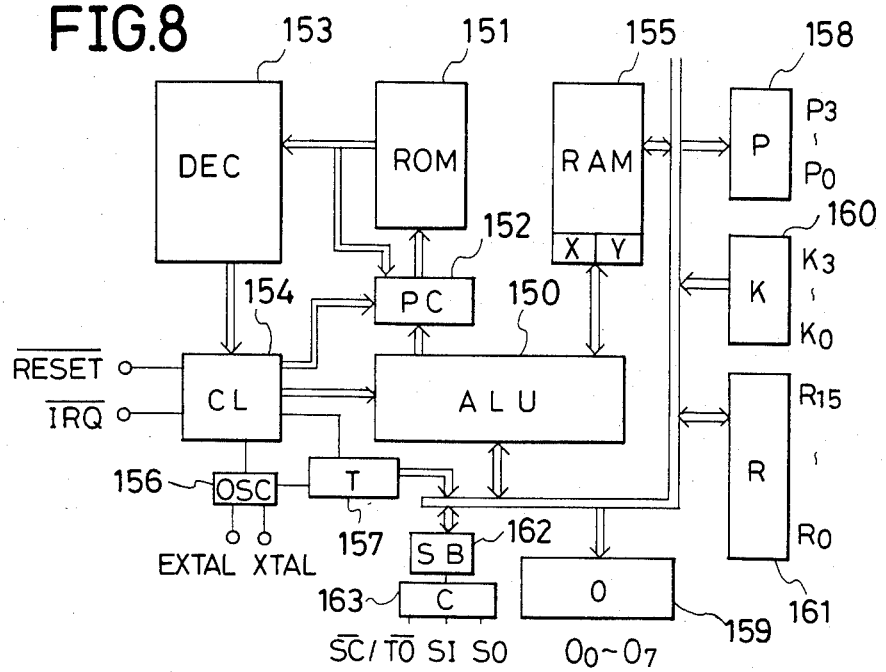
FIG. 8 is a block diagram showing the internal structure of MCU 122 in FIG. 4.

FIG. 8 shows a detailed view of the internal construction of the MCU 122. As seen from FIG. 8, the MCU 122 includes the following main components:

An arithmetic logic unit 150 referred to as ALU 150 in brief; a read-only memory ROM 151 in which instructions to MCU have been written; a program counter 152 referred to as PC 152 by which the addresses of ROM are determined; an instruction decoder referred to as DEC 153 the function of which is to decode the instruction from ROM; a control logic part for executing the decoded instruction referred to as CL 154; a random access memory referred to as RAM 155 which functions as data memory set by X, Y; an oscillation circuit referred to as OSC 156; an internal timer referred to as T 157; output-only ports referred to as P 158 and O 159; an input-only port referred to as K 160; an input/output port referred to as R 161, a serial buffer referred to as SB 162 and a serial port referred to as C 163. A portion of RAM is used as shown in the following Table 7 which will be further described later.

TABLE 7

| Y/X | 0 | 1 | 2 | 3 | 4 | 5 | 6 | 7 |
|---|---|---|---|---|---|---|---|---|
| $0 | $[t_s]_L$ | $[DV]_L$ |  |  | $[BV_0]_H$ | $[BV_0]_L$ | $[PV_0]_H$ | $[PV_0]_L$ |
| $1 | $[t_s]_H$ | $[DV]_H$ |  |  | $[BV_1]_H$ | $[BV_1]_L$ | $[PV_1]_H$ | $[PV_1]_L$ |
| $2 | $[PVth]_L$ |  |  |  | $[BV_2]_H$ | $[BV_2]_L$ | $[PV_2]_H$ | $[PV_2]_L$ |
| $3 | $[PVth]_H$ |  |  |  | $[BV_3]_H$ | $[BV_3]_L$ | $[PV_3]_H$ | $[PV_3]_L$ |
| $4 |  |  |  |  | $[BV_4]_H$ | $[BV_4]_L$ | $[PV_4]_H$ | $[PV_4]_L$ |
| $5 | [C] |  |  |  | $[LV]_H$ | $[LV]_L$ | $[SV]_H$ | $[SV]_L$ |
| $6 | [L] |  |  |  | $[TV_S]_H$ | $[TV_S]_L$ | $[TV_M]_H$ | $[TV_M]_L$ |
| $7 | [CL] |  | AV information | $[SUM]_X$ | $[SUM]_H$ $[AV_S]_H$ | $[SUM]_L$ $[AV_S]_L$ | $[AV_M\text{-}AV_O]_H$ $[AV_M]_H$ | $[AV_M\text{-}AV_O]_L$ $[AV_M]_L$ |
| $8 |  |  | $AV_O$ information |  | $[AV_{OC}]_H$ $[AV_{OP}]_H$ | $[AV_{OC}]_L$ $[AV_{OP}]_L$ | $[AV_O]_H$ | $[AV_O]_L$ |

TABLE 7-continued

| Y/X | 0 | 1 | 2 | 3 | 4 | 5 | 6 | 7 |
|---|---|---|---|---|---|---|---|---|
| $9 | [N] | | | | [MEAN]$_H$ | [MEAN]$_L$ | mode | kind of lens |
| $A | | | | | [MAX]$_H$ | [MAX]$_L$ | | [SI] |
| $B | | | | | [MIN]$_H$ | [MIN]$_L$ | | |
| $C | | | | | [$\Delta$BV]$_H$ | [$\Delta$BV]$_L$ | | |
| $D | | | | | [BVans]$_H$ | [BVans]$_L$ | | |
| $E | | | | | [AV$_S$-AV$_O$]$_H$ | [AV$_S$-AV$_O$]$_L$ | | |
| $F | | | | | | | | |

Referring again to FIG. 4, tools for test are connected to terminals R15, SI, SO and $\overline{SC/TO}$ of the MCU 122. When the tools are used, the switch SW0 is closed. The tools can perform various operations. In order to operate the tools 200, hexadecimal digital values $0–$9, $A, $B–$F are serially input to the serial buffer SB in FIG. 8 from the terminal SI in synchronism with the clock from the terminal $\overline{SC/TO}$. The following table, Table 8 shows the hexadecimal SI inputs and the functions thereof. $0 . . . $9, $A . . . $F in hexadecimal notation correspond to 0, 1, . . . 15 in decimal notation.

TABLE 8

| SI input | Function |
|---|---|
| $ 0 | To put out all of the content of RAM from terminal SO |
| 1 | To set D/A converter 121 to $ 12 (corresponding to LV3) |
| 2 | To set D/A converter 121 to $ 18 (corresponding to LV4) |
| 3 | To set D/A converter 121 to $ 1E (corresponding to LV5) |
| 4 | To set D/A converter 121 to $ 24 (corresponding to LV6) |
| 5 | To set D/A converter 121 to $ 2A (corresponding to LV7) |
| 6 | To set D/A converter 121 to $ 30 (corresponding to LV8) |
| 7 | To set D/A converter 121 to $ 36 (corresponding to LV9) |
| 8 | To set D/A converter 121 to $ 3C (corresponding to LV10) |
| 9 | To set D/A converter 121 to $ 42 (corresponding to LV11) |
| A | To set D/A converter 121 to $ 48 (corresponding to LV12) |
| B | To set D/A converter 121 to $ 4E (corresponding to LV13) |
| C | To set D/A converter 121 to $ 54 (corresponding to LV14) |
| D | To set D/A converter 121 to $ 5A (corresponding to LV15) |
| E | To set $ AD at 0$_7$–0$_0$ ports (+ display) |
| F | To set $ OE at 0$_7$–0$_0$ ports (−$\frac{+}{M}$ display) |

The manner of operation of the tools for test 200 will be described in detail with reference to FIGS. 20A and 20B. As one of the operations the tools can be used to read out the content of the internal data memory RAM from the terminal SO synchronizing with the clock from the terminal $\overline{SC/TO}$. During the readout, the terminal R15 whose output is "L" functions to adjust the timing.

The content of Table 8 will be described later.

Figure 9:
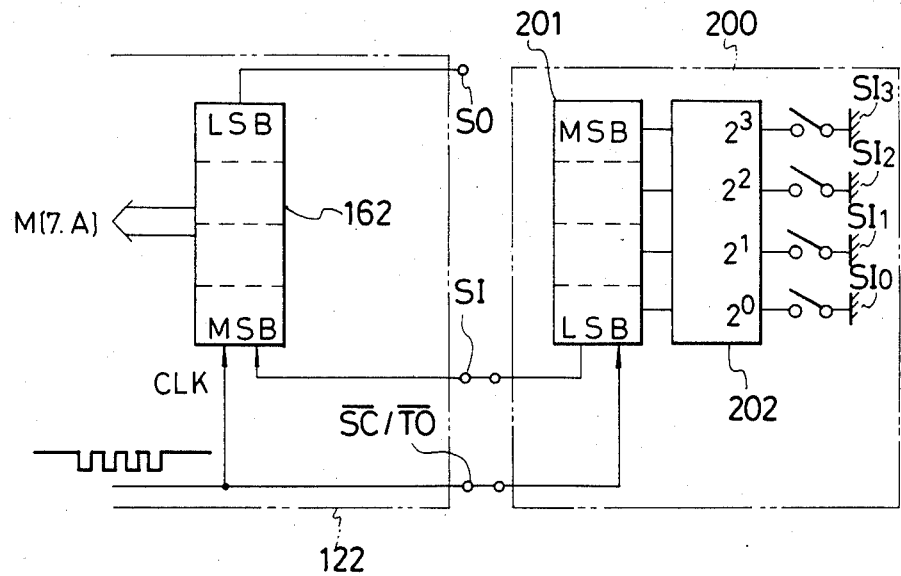
FIG. 9 illustrates the manner of operation of a serial input/output port.

FIG. 9 shows a construction for setting serial inputs at the terminal SI.

In synchronism with the synchronizing signal from the terminal $\overline{SC/TO}$, a signal is transmitted to SI terminal from the register 201 and an output signal is generated from SO terminal. In accordance with the instruction from the MCU 122 a synchronizing signal is generated from the terminal $\overline{SC/TO}$ by the internal clock. Synchronizing with the clock the content of the register 201 is transferred to a 4-bit serial buffer 162 through terminal SI. In the register 201 of the test tools 200 there have previously been set information of four bits from least significant bit (referred to as LSB) to most significant bit (MSB) by switches SI$_0$ to SI$_3$ through a setting device 202. The content of the register is transferred to the buffer 162 starting from the least significant bit LSB. SI inputs, SO to SF are set by the four switches and transferred to the register of the test tool 200. By closing the switch for test SW0 (FIG. 4), the information can be read in MCU 122.

Figure 10:
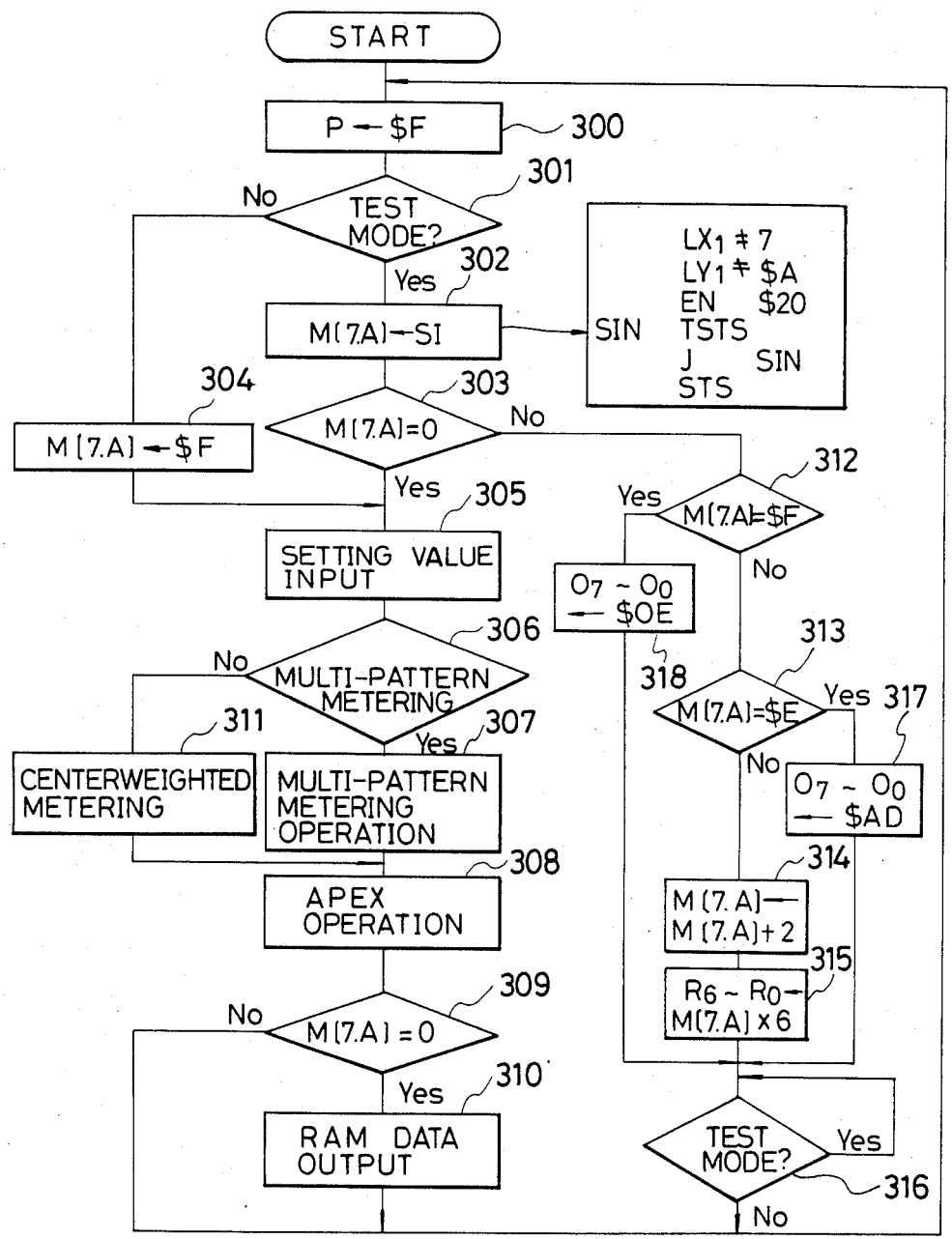
FIG. 10 is a flow chart of MCU 122.

FIG. 10 is a flow chart showing the operation of MCU 122.

At step 300, P port is set to $F. Thereby the state of switch SW0 at terminal F of the multiplexer 120, namely ON or OFF of the switch SW0 becomes readable from terminal K0 of MCU 122 at Step 301.

In normal use of the camera, the switch SW0 can never be ON. Therefore, the output at terminal K0 is "H" and, at Step 302, $F is set to M[7, A] shown in Table 7 as data memory to be set at terminal SI. Herein, M[7, A] means a 4-bit data memory whose X register is determined by 7 and Y register by $A.

On the other hand, for adjustment or test of the camera, the switch SW0 is closed. The output of terminal K0 becomes "L". At the time, in the manner previously described with reference to FIG. 9, SI inputs set by the test tools 200 are taken in. In case of the micro-computer MB 8851 (FUJITSU Ltd.) as used in this embodiment, the take-in operation is executed in the following manner (instruction codes are those of MB 8851):

In accordance with an instruction LXI for setting X register of the data memory, 7 is set and in accordance with a Y register setting instruction LYI, $A is set. Further $20 is set by an instruction EN to initiate the serial port by the internal clock as shown in FIG. 9. In accordance with an instruction TSTS a serial buffer full/empty flag (SF) is checked as to whether it is 1 or not. SIN is a label. Until the completion of transmission of 4-clock pulse from the terminal $\overline{SC/TO}$, the operation remains jumped to SIN. After the transmission of the 4-clock pulse, in accordance with an instruction STS, the 4-bit data transferred into the serial buffer 162 are stored in the data memory M[7, A].

Subsequent to the above operation, it is checked what kind of test shown in Table 8 is to be carried out. If M[7, A]=0 at Step 303, then, as it means the mode for reading out all of the content of RAM 155, a normal sequence is started. However, since 0 is stored in M[7, A], the operation is different from SF in the common case. After completing a sequence of operations of the camera, the outputting of data from RAM 155 is started.

If M[7, A]=0 is denied, it is checked at Step 312 whether M[7, A]=$F. When "yes", $OE is set to the terminals 0$_7$ to 0$_0$ of MCU 122 to render the outputs of 0$_7$ to 0$_5$ all "L". Therefore, the display circuit 123 makes a display of "− +". Also, as the terminals 0$_4$ to 0$_0$ become "D1110B" (B means binary digit), there is displayed 吕吕.吕▫ as seen from Table 6. After all there appears on the display all of the pattern shown in FIG. 7. Therefore, one can check whether LCD is visible well or whether the condition of contact is good. By the way, it is to be understood that the thing necessary for setting $F to the input of terminal SI is only to keep the terminal SI open. Checking of display with all display elements being turned on is possible only by closing the switch SW0 without connecting the tools 200. When M[7, A]=$E at Step 313, it is possible to have the display circuit 123 make a display of "+ ▫" by setting $AD to terminals O7 to O0 at Step 317. This step can be used to check the pattern display by LCD as to whether the position of the pattern in the finder is suitable, by taking a picture of the pattern by a television camera. As the left and right end portions of the pattern in FIG. 7 are displayed, the precision of positioning of the pattern can be increased by this check.

When M[7, A]=$E is not held, it means that M[7, A] is between $1 and $D. By adding 2 at Step 314 as shown below $$M[7, A] \leftarrow M[7, A] + 2,$$

the value of M[7, A] becomes any one of the values from $3 to $F. At Step 314, the value of M[7, A] is multiplied by 6 and the resultant value is put out from terminals R6~R0 as follows:

$$R6 \sim R0 \leftarrow M[7, A] \times 6.$$

Thereby any of $12, $18, ... $54, $5A is set at terminals R6~R0 as shown in Table 8. These values correspond to luminance vlaues LV3, LV4, ..., LV14, LV15 (ASA/ISO:100) in A/D converted value of metering output obtained when a standard lens, that is, a lens of 50 mm, F 1.4 is mounted (see Table 1). Adjustments of the metering outputs are carried out by shifting the output levels by adjusting the semi-fixed resistors VR0~VR4.

The effect of offset can be cancelled by adjusting the semi-fixed resistors VR0~VR4 to the position at which the comparators 110 to 114 are inverted when a surface of uniform luminance is measured through the standard lens while keeping the output of D/A converter 121 fixed.

When the switch SW0 is closed for setting the test mode at Step 316 and the output to SI terminal is $1~$F at the time, the output of O port or R port is set and thereafter the terminal K0 is monitored again to check whether the mode is test mode or not at Step 316. During this time, the switch for test SW0 is held in its closed position. The apparatus is returned to the start position after the switch SW0 is opened.

The step for the input of set values (Step 305) and the following steps in the flow chart show a flow of operations for a normal exposure operation of the camera. Although the operations for the input of set values will be described later in detail, the step 305 is a step in which inputs by switches SW1~SW6, metering circuits 100~104 through the multiplexer 120 and the A/D converted values of setting devices 115~118 are written in RAM.

At the next step, Step 306, the $2^3$ position of M[6, 9] is checked as to whether the mode is multi-pattern metering mode. As seen from Table 3, when the $2^3$ position of M[6, 9] is 1, the mode is multi-pattern metering mode. If it is O, the mode is centerweighted metering mode. In the centerweighted metering mode, luminance value, $[BV_0]_{H,L}$ is calculated from metering output $[PV_0]_{H,L}$ of the center zone, and the value $[BV_0]_{H,L}$ thus obtained is used as optimum luminance value $[BVans]_{H,L}$ for the following Apex operation. Herein, the affix H,L of $[PV_0]_{H,L}$ stands for both of $[PV_0]_H$ and $[PV_0]_L$ at the same time. $[PV_0]_H$ and $[PV_0]_L$ correspond to M[6, 0] and M[7, 0] in Table 7 respectively. Multi-pattern metering is a known exposure control system in which an optimum exposure value is calculated from a plural number of (in this embodiment, five) metering outputs $[PV_0]_{H,L}, [PV_1]_{H,L} \ldots , [PV_4]_{H,L}$. After correcting various effects such as vignetting by means of signals of the lens, the metering outputs are converted into the corresponding luminance values $[BV_0]_{H,L}, [BV_1]_{H,L} \ldots , [BV_4]_{H,L}$. Thereafter, calculations are carried out to obtain maximum luminance value $[MAX]_{H,L}$, minimum luminance value $[MIN]_{H,L}$, mean luminance value $[MEAN]_{H,L}$, luminance difference $[\Delta BV]_{H,L}$ etc. Finally an optimum luminance value $[BVans]_{H,L}$ is obtained by calculation. This process of multi-pattern metering is known, for example, from the specifications of U.S. Pat. Nos. 4,306,787 and 4,412,730.

In the next routine, APEX operation is carried out using the luminance value $[BVans]_{H,L}$ obtained from the centerweighted metering at Step 311 or from the multi-pattern metering at Step 307. At Step 308, there are obtained by APEX operation a display value $[DV]_{H,L}$ which is applied to O port, a shutter speed value $[TV_S]_{H,L}$ which is applied to R13~R7 to control the shutter and an aperture control timing value $[t_s]_{H,L}$, and the respective output ports are set by the values obtained.

The flow of common exposure control operations of the camera ends at the above step of APEX operation. However, according to the flow chart shown in FIG. 10, additional steps, Step 309 and Step 310 are executed.

At Step 309 it is checked whether M[7, A]=0. When an affirmative answer is obtained, it means RAM data output mode. Therefore, at Step 310 all of the content of RAM 151 shown in Table 7, that is, data of $8 \times 16 = 128$ words are put out from the terminal S0 synchronizing with the clocks generated from $\overline{SC/TO}$ terminal.

This RAM data output allows checking of various conditions in a simple manner afterwards. For example, ON-OFF of input switches, adjusted levels of metering outputs, set values by setting devices etc. can be checked easily after the RAM data output. After the completion of the RAM data output, the sequence is returned to the start position and the above operation sequence is repeated from the step of input of set values. Therefore, one can readjust the metering outputs by suitably changing the positions of the semi-fixed resistors VR0 to VR4. Also, one can check whether input switches function correctly, by turning them on and off. Further, one can move the shutter time setting device, film sensitivity setting device, diaphragm ring or a F-number interlocking lever to carry out checking of whether the setting of values goes well.

In usual cases, the RAM data output is not carried out because $F is set in M[7, A].

FIG. 11 is a flow chart of interruption operation after the shutter button is depressed and the release switch SW7 is closed.

The interruption routine starts when the output level of the interruption terminal $\overline{IRQ}$ of MCU 122 changes to L and that of terminal K2 changes to H. This time point corresponds to t1 in FIG. 5. A release sequence of the mechanical system is performed by members interlocked with the shutter button. When the stop-down start switch SW3 is opened, the internal timer of MCU 122 is started and then a waiting continues until $t = t_1 + t_s$. After that, the output of terminal R14 is changed H→L→H. During the time of R14 being "L", current is supplied to a transistor Tr1 to energize a diaphragm-stopping magnet 131. Thereby the aperture stopping motion is stopped at a determined number of stop-down steps, $AV_S - AV_O$. Thereafter, MCU 122 has nothing to do but waiting the change H→L of terminal K1. The output of the terminal K1 becomes "L" when a mirror switch SW9 is closed after mirror-down at the completion of the release sequence of the mechanical system. Thus, the release sequence is all over.

As previously mentioned, the shutter control circuit 124 controls the shutter time after mirror-up. Namely, the shutter time is controlled to a determined value preset at R13~R7 of MCU 122.

FIG. 12 shows the sub-routine for the input of setting values.

The output of P port shown in FIG. 4 is set to 8, Y register of RAM to 8 and A/D conversion is carried out. Thereby an output of the comparator 118 selected by "8" of P port is transmitted to the terminal K0 of MCU 122 through the multiplexer 120. In this manner, successive comparison A/D conversion is carried out by converter 121, comparator 118 and MCU 122. The maximum aperture (fully open stop) signal $AV_O$ from the setting device 108 is A/D converted and, as shown in Table 7, less significant four bits of the signal (referred to as $[AV_O]_L$) are stored in M[7, 8] and significant bits of the signal (referred to as $[AV_O]_H$) in M[6, 8]. As shown in Table 1, the maximum value of $[AV_O]_{H,L}$ is \$ 2A. Therefore, in practice, $[AV_O]_H$ contains information of only two bits. The above operation is repeated while decreasing P port and Y register by decrement of 1 every time until Y=\$F. As a result of these operations, information of set number of stop-down steps $[AV_M-AV_O]_{H,L}$ is stored in M[6, 7] and M[7, 7], information of set shutter speed $[TV_M]_{H,L}$ in M[6, 6] and M[7, 6], and information of film sensitivity $[SV]_{H,L}$ in M[6, 5] and M[7, 5]. Also, metering output $[PV_4]_{H,L}$ is stored in M[6, 4] and M[7, 4]. Similarly, $[PV_3]_{H,L}, \ldots, [PV_0]_{H,L}$ are stored in M[6, 3], M[7, 3] ..., [6, 0], [7, 0].

FIG. 13 is a flow chart showing the details of A/D conversion sub-routine in FIG. 12.

At first, ⌈1000000⌋ is set at output ports R6~R0 of MCU 122 shown in FIG. 4 so that an analog value corresponding to $2^6=64$ is generated from D/A converter 121. The value 64 is nearly the middle value of the total range of change from 0 to 127.

At the next step, M[6, Y] and M[7, Y] are cleared and the input to terminal K0 is monitored. If K0=H, since the output of the comparator selected by P port is 1, the measured analog value is larger than $2^6$. Therefore, in this case, 1 is set at the $2^2$ position of M[6, Y] storing significant four bits. On the contrary, if the output of the comparator is smaller than $2^6$, then the terminal R6 is reset while leaving the memory M[6, Y] intact. After turning the output of terminal R5 to H and setting 1 at the $2^5$ position of D/A converter 121, the same comparison as above is carried out for the next less significant bit. This operation is repeated until the successive comparison A/D conversion of seven bits is completed.

Figure 14:
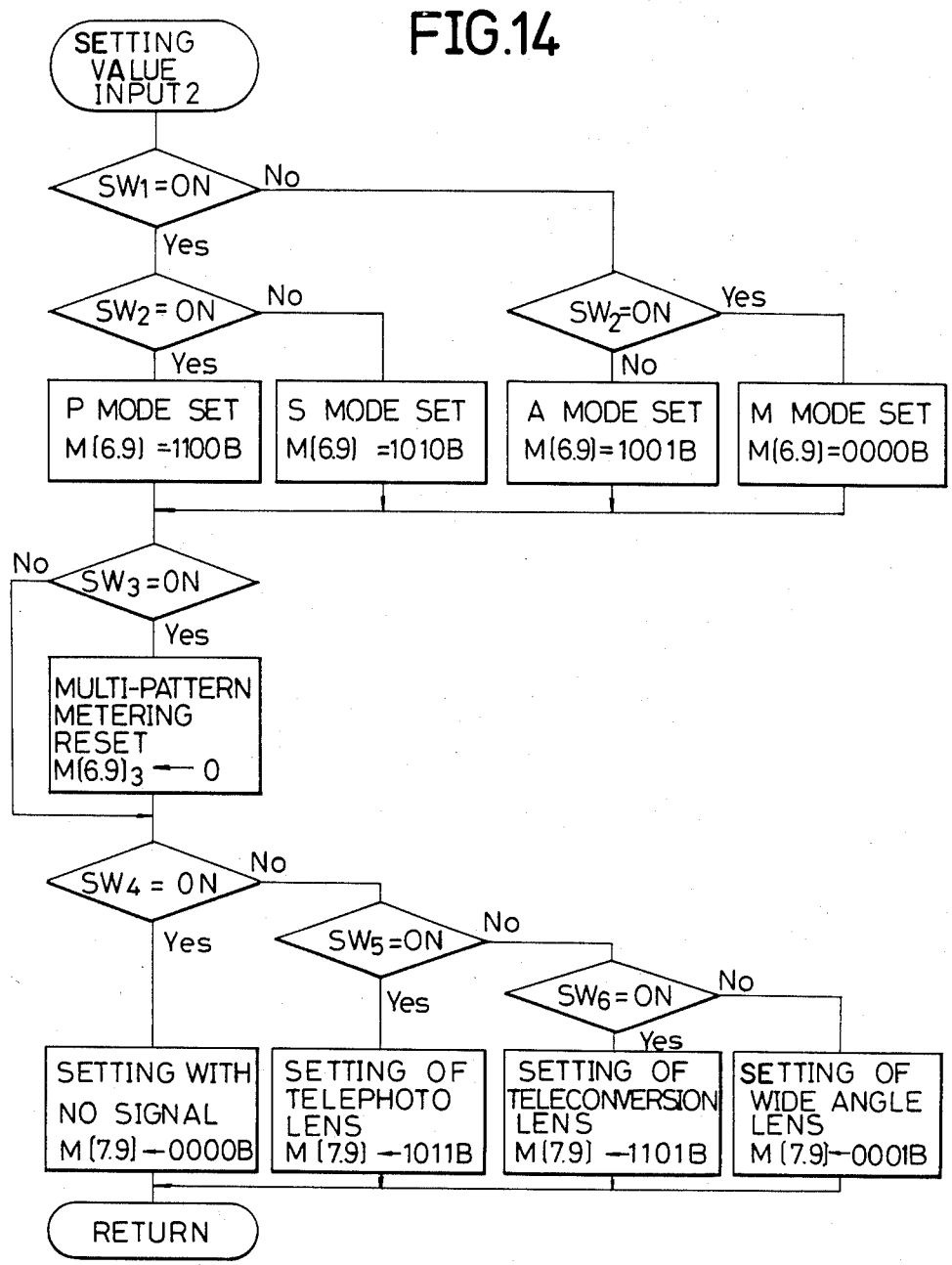

FIG. 14 is a flow chart of the second part of the setting value input sub-routine continued from FIG. 12.

Figure 15:
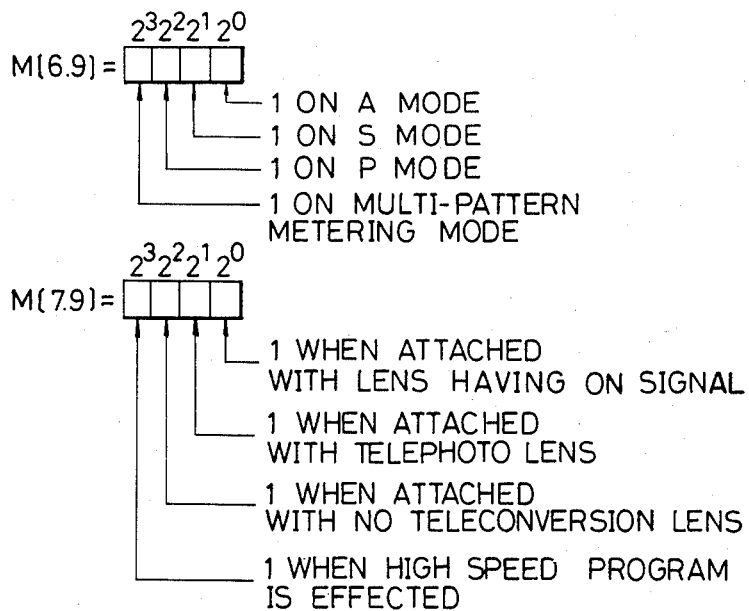
FIGS. 15 and 16 are explanatory views of a part of data memory.
Figure 16:
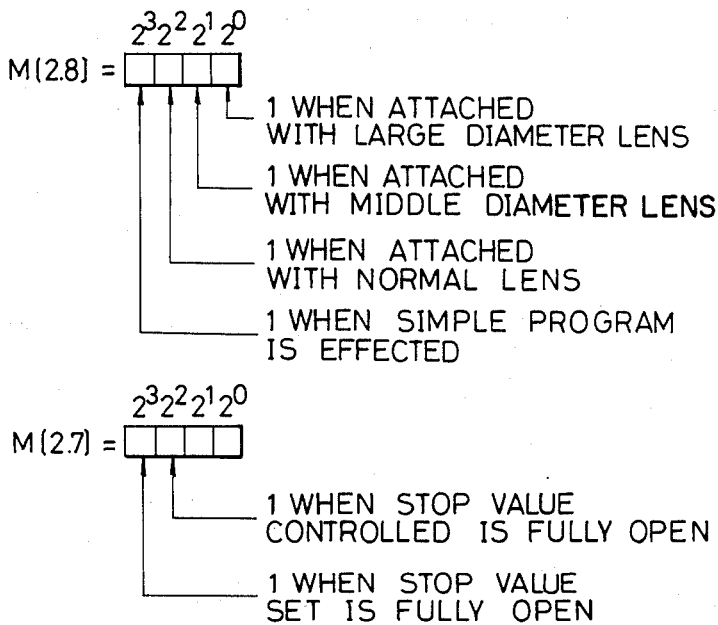

When both of switches SW1 and SW2 are closed, it means P mode. Therefore, in this case, as memory for storing mode information, ⌈1100B⌋ (B means binary digit) is stored in M[6, 9] as shown in FIG. 15. The digit in the position $2^3$ serves as a flag for checking of whether it is the multi-pattern metering mode described in connection with FIG. 10. By setting the flag to 1, the multi-pattern metering mode is set at the same time.

When the switch SW1 is closed and the switch SW2 is opened, it means S mode. Therefore, in this case, ⌈1010B⌋ is stored in M[6, 9]. When both of the switches SW1 and SW2 are closed, it means A mode. In this case, ⌈1001B⌋ is stored in M[6, 9]. For any of these three cases the multi-pattern metering mode is set. On the contrary, for M mode in which the switch SW1 is opened and SW2 is closed, the centerweighted metering mode is set by setting of M[6, 9]=0000B wherein the flag of multi-pattern metering in the $2^3$ position is 0. Therefore, in M mode, no multi-pattern metering operation is carried out. The reason for this is that M mode is the mode in which the photographer's will can be reflected in exposure. By the selection of the centerweighted metering mode, switch SW3 is closed. After verifying the closing of the switch SW3, the multi-pattern metering mode is reset by setting M[6, 9]$_3$ to 0.

At the next step, the state of switch SW4 is checked as to whether it is closed or opened. When SW4 is ON (closed), O is stored in M[7, 9] as information of a lens having no signal of focal length.

At the following steps, the state (ON or OFF) of switch SW5 and the state of SW6 are checked successively to discriminate the kind of the attached lens, if any, among telephoto lens, teleconversion lens and wide angle lens. In FIG. 15, the $2^3$ position of M[7, 9] is used to set the high speed program mode shown in FIG. 17 when program mode is selected.

Figure 17:
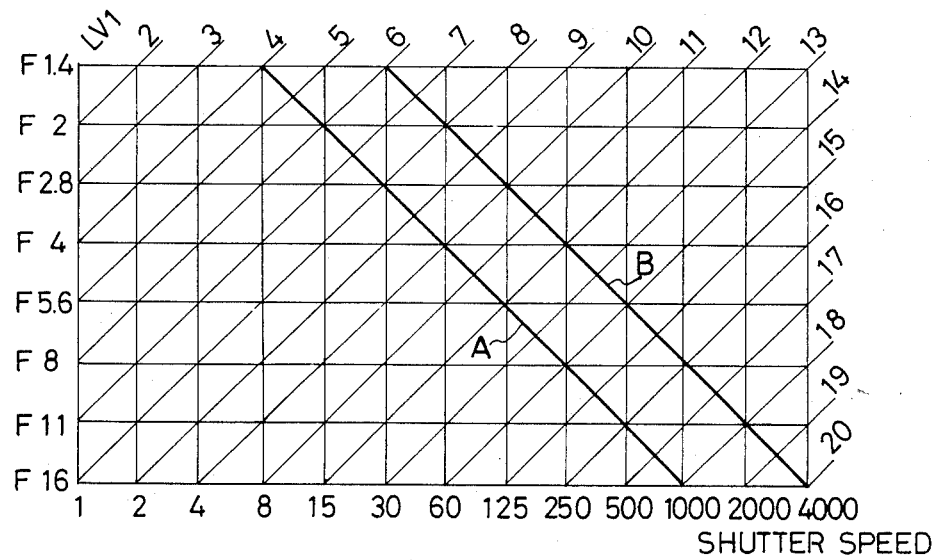
FIG. 17 is a program diagram.

FIG. 17 is a program diagram of P mode plotted with the stop value (=aperture value in F-number) as the ordinate and the shutter speed as the abscissa. In FIG. 17, the standard program diagram A is that obtained when a F 1.4 lens having a focal length smaller than a certain determined value was mounted and it was used with the stop value preset to F 16. The high speed program diagram B is that as obtained when a teleconversion lens was attached to the F 1.4 lens.

Figure 18:
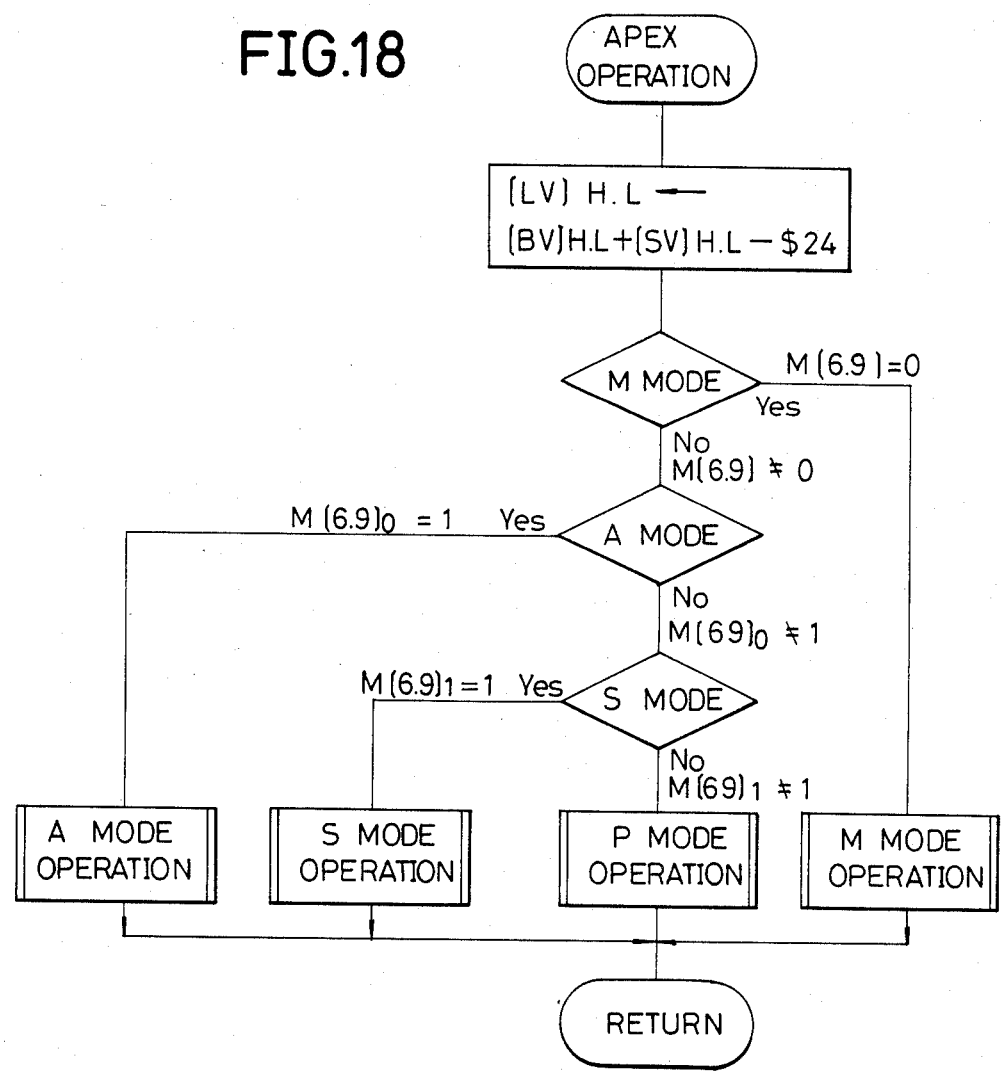
FIG. 18 is a flow chart of APEX operation subroutine.

FIG. 18 is a flow chart of the APEX operation sub-routine in FIG. 10.

Memory $[SV]_{H,L}$ corresponding to the film sensitivity APEX value SV shown in Table 7 is transferred to M[4, 5], M[5, 5] shown in the same table and then memory [BV] corresponding to the luminance value BV is added thereto so that M[4,5], M[5,5] becomes memory [LV] corresponding to the LV (light Value) as shown below:

$$[LV] \leftarrow [SV]$$

$$[LV] \leftarrow [LV] + [BV]$$

$$\therefore LV = BV + SV$$

However, as seen from Table 1, so far as SV and (BV-$AV_O$) are concerned, no correct APEX value can be obtained merely by dividing it by 6. Therefore, the following correction is carried out:

$$[LV] \leftarrow [LV] - \$ 24$$

Thereafter, the mode information memory M[6, 9] shown in FIG. 7 is checked to ascertain the mode set for exposure control.

As seen from FIG. 14 and FIG. 15, when M mode is set, M[6, 9]$_0$ to M[6, 9]$_3$ are all 0. That is to say, M[6, 9]=0. Therefore, in this case, M mode operation is carried out as shown in FIG. 18.

Next, the bit of M[6, 9]$_0$ is checked. When it is 1, A-mode operation routine is carried out.

Then the bit of M[6, 9]$_1$ is checked. When it is 1, S mode operation routine is executed. On the contrary, when M[6, 9]$_1$ is 0, P mode operation routine is executed. This manner of selection of operation routine is obvious from FIG. 18.

Details of the content of the operation in every mode need not be described further. The result of above APEX operation is as follows:

A display output value $[DV]_{H,L}$ is obtained from M[1, 1], M[1, 0] to control the display circuit 123. The display output value is applied to $O_7 \sim O_0$ port. According to the mode selected, a pattern as shown in FIG. 7 or M, +, − is displayed thereby. Also, a controlled shutter speed value $[TVs]_{H,L}$ is obtained from M[4, 6], M[5, 6]. R13∼R7 are set by the value to obtain a diaphragm stop timing value $[t_s]_{H,L}$, which is then stored in M[0, 1], M[0, 0].

Figure 19:
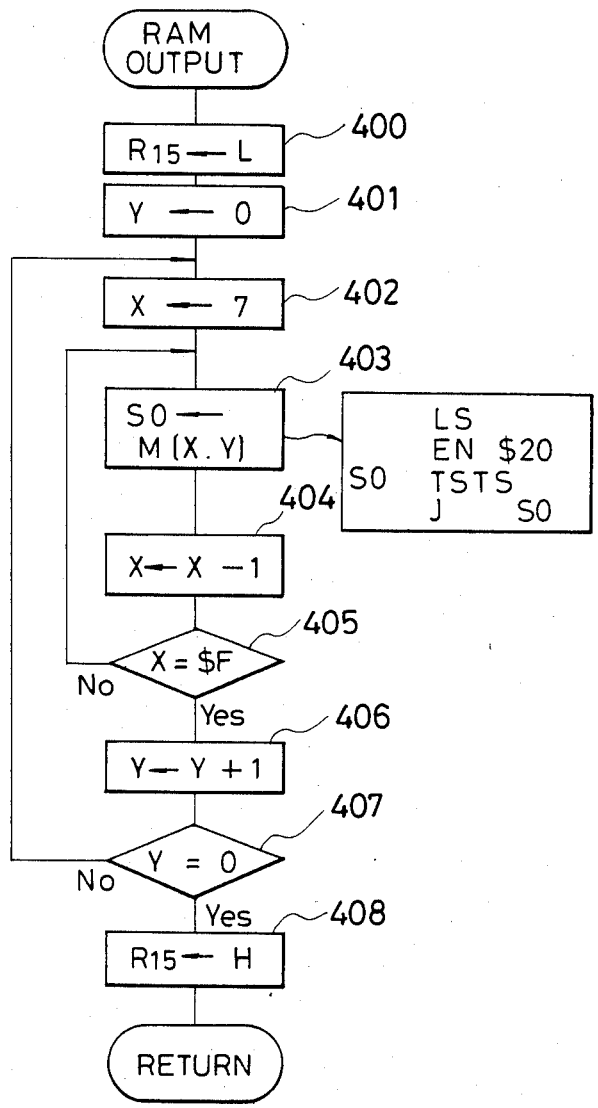
FIG. 19 is a flow chart of RAM data output subroutine.

FIG. 19 is a flow chart of RAM data output subroutine in FIG. 10.

At Step 400, the terminal R15 is set to L, at Step 401 Y register is set to 0 and at Step 402 X resister is set to 7.

At Step 403, data memory M[X, Y] determined by X, Y is serially transmitted out from terminal SO. In the instruction code of the above-referred MB 8851 by FUJITSU Ltd., a 5-byte instruction is issued. Concretely speaking, RAM data designated by M[X, Y] are transferred to the serial buffer SB in, accordance with LS instruction. Thereafter, in accordance with EN instruction, $ 20 is set to start the serial port by the internal clock. In accordance with TSTS instruction, SF flag is tested and the step remains jumped to the label indicated by SO until the output of 4-clock pulse. Upon the output of the 4-clock pulse, M[X, Y] data of the serial buffer SB are put out from the terminal SO. At the time, the content of M[X, Y] can be read in synchronism with the clock from the terminal SC/TO.

At Step 404, the content of X register is decremented by 1 and the content of M[0, 6] is put out from SO terminal. This operation is repeated until X=$F at Step 405. By the time of X=$F transfer of M[7, 0], M[6, 0], ..., M[0, 0] has been completed. Therefore, at Step 406, the content of Y register is incremented by 1 and X register is set again to 7. After that, the same operation as above is repeated. When Y becomes O (Y=O) by the repeating of Y←Y+1, the operation of Y=O∼$F comes to an end. Thus, transfer of all of 128-word data of M[7, 0], M[0, 0], M[7, 1], ..., M[0, 1], ..., M[7, F], ..., M[0, F] is completed. At the last step, Step 407, the output of terminal R15 is turned to H to terminate the flow of the RAM data output sub-routine. The serial output SO is sent out with the falling of the clock from SC/TO.

Figure 20A:
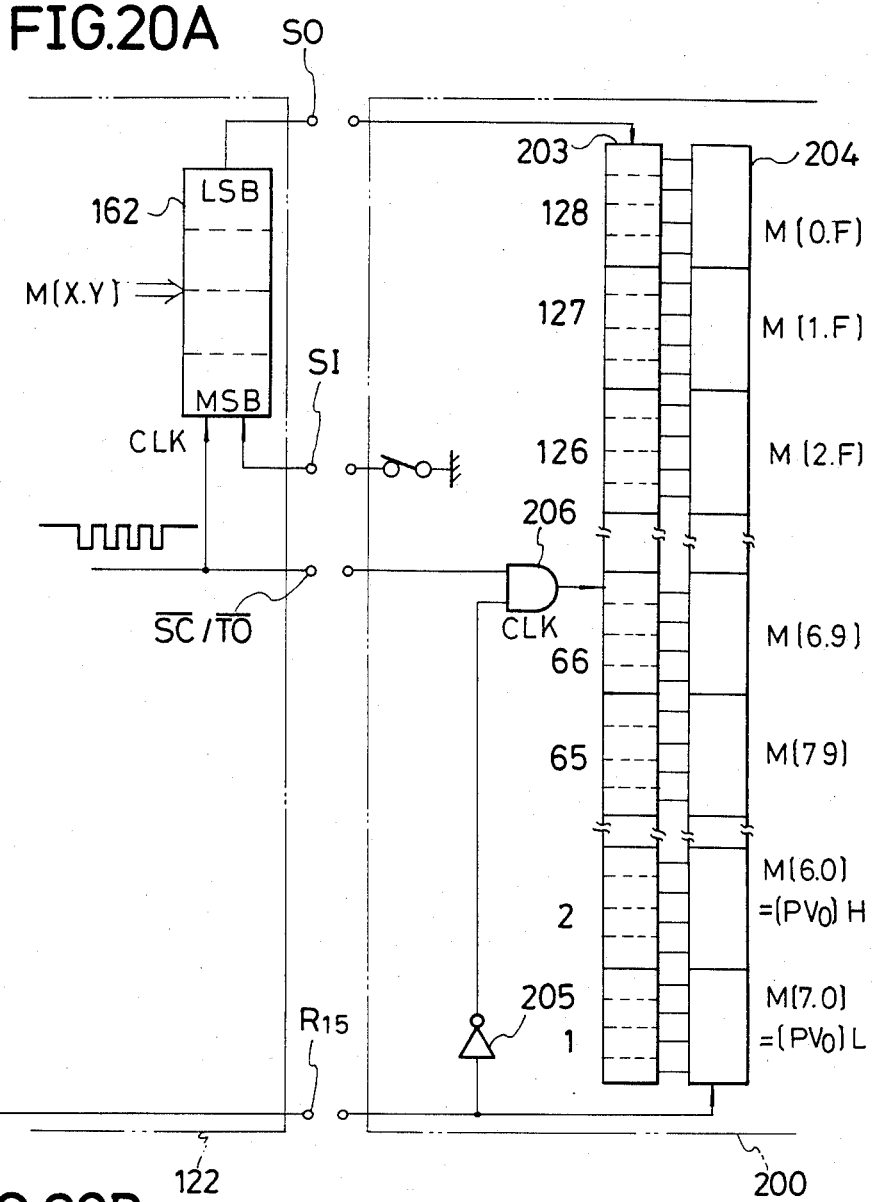
FIGS. 20A and 20B are illustrative views showing tools for reading RAM data.

FIG. 20A schematically shows apparatus for outputting data of RAM 155 and reading data of RAM 151. FIG. 20B is a timing chart showing the operation timing of the apparatus.

In order to set a mode for outputting data of RAM 155, a setting of $O at terminal SI is required. But, as shown in FIG. 20A, it can be attained also simply by grounding the terminal SI. Among the readout RAM data any information can be taken out at will by a 512-bit (=4 bits×8×16) register 203 synchronized with the clock from terminal SC/TO of MCU 122. One can read the content of the register 203 through a display device 204.

Figure 20B:
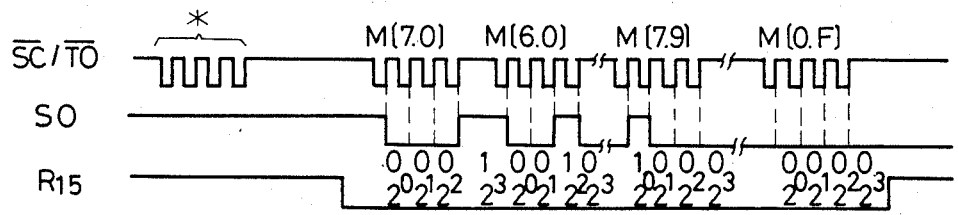

During the output of RAM data, the output level of terminal R15 is "L" as seen from FIG. 20B. Therefore, by sychronizing the timing of data output with it, an easy discrimination between individual data of M[X,Y] is possible.

An inverter 205 and an AND gate 206 are provided to eliminate the clock coming from SC/TO during the data input from terminal SI shown in FIG. 9 (the clock to be eliminated is the part indicated by mark "*" in FIG. 20B). During the time of terminal 15 being "L", the content of the register 203 changes serially with time. However, during the time of R15 being "H", the content of the register is fixed and it is displayed on the display unit 204. For example, the metering output derived from the central zone of the picture field is stored in M[7, 0], M[6, 0] as $[PV]_{H,L}$. Therefore, this value is the data which is to be transferred first from terminal SO. As an example, in case that a 50/1.4 lens is mounted on the camera and the measured luminance is EV 12 (ISO 100), the data will be transferred as 0, 0, 0, 1, 0, 0, 1, 0. Therefore, one can read it as $ 48. Similarly, M[7, 9] is transferred 65-thly. If it is put out as 1 0 0 0, the data is 0 0 0 1 B which means that a wide angle lens is set as seen from FIG. 14.

In the embodiment shown in FIG. 20A, all of 512-bit content of RAM 151 is read out. However, the embodiment may be modified to read out necessary bits only. Of course it is not always necessary to send out all of bits from the camera side.

While the switch SW0 has been used to set the mode for test, it is to be understood that it is also possible to discriminate the mode from others by means of the input to SI terminal only. The reason for which the switch SW0 has been used in the above embodiments is solely to present a mode in which tests are possible by a simple operation of a switch SW0.

It is not absolutely necessary for SW0 to be a complete switch. The thing necessary is to have a terminal. The same purpose may be attained by shortcircuiting the terminal to ground.

I claim:

1. A camera in which an object field is divided into a plural number of zones, the light on said respective zones is measured individually, and data corresponding to said outputs of the respective measurements are produced said camera comprising:
   (a) means for storing said data;
   (b) an input terminal for the input of a determined signal;
   (c) means for generating a synchronizing signal;
   (d) means for detecting the input of said determined signal to said input terminal and generating a detection signal when said input is detected;
   (e) means for generating said data bit by bit serially in response to said detection signal and in synchronism with said synchronizing signal; and
   (f) an output terminal electrically connected with said data generating means to output said data generated from said data generating means.

2. A camera system for checking data stored in a camera, said camera system comprising:
   (a) means for processing said stored data including input terminal means for the input of a determined signal;
   means for generating a synchronizing signal;
   means for detecting the input of said determined signal to said input terminal means and generating a detection signal when said input is detected;
   means for generating a signal having two different levels, said signal having one of the two levels in response to said detection signal; and
   output terminal means to output said data; and
   (b) means for checking said data including means for storing said data;

means for inputting said determined signal to said input terminal means; and means for transferring said data through said output terminal means to said data storing means in response to said signal having the one level and in synchronism with said synchronziing signal.

3. A camera in which an object field is divided into a plurality of zones, the light on the respective zones is measured individually, and data corresponding to outputs of the respective measurements are produced, said camera comprising:

(a) means for storing said data;

(b) an input terminal for the input of a determined signal;

(c) means for detecting the input of said determined signal to said input terminal and generating a detection signal when said input is detected;

(d) means for generating said data in response to said detection signal;

(e) means for inputting a synchronizing signal to said generating means, said generating means generating said data bit by bit serially in synchronism with said synchronizing signal; and (f) an output terminal electrically connected with said data generating means to output said data generated from said data generating means.

4. A camera system for checking data stored in a camera, said camera system comprising:

(a) means for processing said stored data including input terminal means for the input of a determined signal;

means for detecting the input of said determined signal to said input terminal means and generating a detection signal when said input is detected;

means for generating a signal having two different levels, said signal having one of the two levels in response to said detection signal; and output terminal means to output said data; and (b) means for checking said data including means for storing said data;

means for inputting said determined signal to said input terminal means;

means for transferring said data through said output terminal means to said data storing means in response to said signal having the one level; and means for inputting a synchronizing signal to said transferring means, said transferring means transferring said data to said data storing means in synchronism with said synchronizing signal.

5. A camera operated in accordance with predetermined data, comprising:

(a) means for inputting therein a predetermined signal;

(b) means for detecting that the predetermined signal is input to the inputting means and generating a detection signal;

(c) receiving means having an input terminal, the receiving means receiving said predetermined data in response to said detection signal;

(d) means for generating a synchronizing signal, in synchronism with which said receiving means receives said predetermined data bit by bit serially;

(e) display means having displaying zones which include a first zone, a second zone and a third zone located in between said first and second zones, each of the first, second and third zones being formed with a plurality of display parts; and (f) means for driving said plurality of display parts, the driving means driving at least a portion of said plurality of parts of said first zone and at least a portion of said plurality of parts of said second zone in response to said predetermined data received by said receiving means.

6. A camera operating in accordance with predetermined data, comprising:

(a) inputting means for inputting therein a predetermined signal;

(b) means for detecting that the predetermined signal is input to said inputting means and generating a detection signal;

(c) receiving means having an input terminal, the receiving means receiving data in response to said detection signal;

(d) means for generating a synchronizing signal, in synchronism with which said receiving means receives said data serially bit by bit;

(e) display means having a plurality of zones, each having a plurality of display parts; and (f) means for driving said display parts independently from each other, the driving means driving all of said display parts of all of said zones concurrently to render all of them visible concurrently in response to said predetermined data received by said receiving means.

7. A camera having means for converting a digital signal to an analog signal, metering means for detecting brightness of an object to be photographed and generating an analog signal, and means for comparing the analog signal from said converting means and the analog signal from said metering means, said camera comprising:

(a) input means for inputting therein a predetermined signal;

(b) means for detecting that the predetermined signal is input to the input means and generating a detection signal;

(c) receiving means having an input terminal, the receiving means receiving data in response to said detection signal;

(d) means for inputting to said receiving means a synchronizing signal, in synchronism with which said receiving means receives said data serially bit by bit; and (e) means for inputting said digital signal to said converting means in accordance with data received by said receiving means.

8. An apparatus capable of being attached to a camera having data memory function, comprising:

(a) a terminal for inputting data stored in said camera;

(b) means for receiving a predetermined signal;

(c) means for detecting that said receiving means has received said predetermined signal and generating a detection signal;

(d) store means;

(e) means for transferring said data from said camera to said store means through said terminal in response to said detection signal, said store means storing said data transferred by said transferring means; and (f) means for inputting a synchronizing signal to said transferring means, said transferring means transferring said data bit by bit serially to said store means in synchronism with said synchronizing signal.

9. An apparatus according to claim 8, said apparatus further comprising display means for displaying said data stored by said store means.

10. A camera operated in accordance with predetermined data, comprising:
   (a) means for inputting therein a predetermined signal;
   (b) means for detecting that the predetermined signal is input to the inputting means and generating a detection signal;
   (c) receiving means having an input terminal, the receiving means receiving said predetermined data in response to said detection signal;
   (d) means for inputting a synchronizing signal to said receiving means, said receiving means receiving said predetermined data bit by bit serially in synchronism with said synchronizing signal;
   (e) display means having displaying zones which include a first zone, a second zone and a third zone located in between said first and second zones, each of the first, second and third zones being formed with a plurality of display parts; and
   (f) means for driving said plurality of display parts, the driving means driving at least a portion of said plurality of parts of said first zone and at least a portion of said plurality of parts of said second zone in response to said predetermined data received by said receiving means.

11. A camera operating in accordance with predetermined data, comprising:
   (a) inputting means for inputting therein a predetermined signal;
   (b) means for detecting that the predetermined signal is input to said inputting means and generating a detection signal;
   (c) receiving means having an input terminal, the receiving means receiving data in response to said detection signal;
   (d) means for inputting a synchronizing signal to said receiving means, said receiving means receiving said predetermined data bit by bit serially in synchronism with said synchronizing signal;
   (e) display means having a plurality of zones, each having a plurality of display parts; and
   (f) means for driving said display parts independently from each other, the driving means driving all of said display parts of all of said zones concurrently to render all of them visible concurrently in response to said predetermined data received by said receiving means.

* * * * *